United States Patent
Engle

(10) Patent No.: US 9,723,294 B2
(45) Date of Patent: Aug. 1, 2017

(54) ADJUSTING HORIZONTAL AND VERTICAL SHADING IN 3-D RENDERING

(71) Applicants: SONY CORPORATION, Tokyo (JP); SONY PICTURES TECHNOLOGIES, INC., Culver City, CA (US)

(72) Inventor: Robert B. Engle, Encino, CA (US)

(73) Assignees: SONY CORPORATION, Tokyo (JP); SONY PICTURES TECHNOLOGIES, INC., Culver City, CA (US)

( * ) Notice: Subject to any disclaimer, the term of this patent is extended or adjusted under 35 U.S.C. 154(b) by 161 days.

(21) Appl. No.: 13/782,171

(22) Filed: Mar. 1, 2013

(65) Prior Publication Data

US 2014/0247265 A1    Sep. 4, 2014

(51) Int. Cl.
| | |
|---|---|
| H04N 13/02 | (2006.01) |
| G06T 15/20 | (2011.01) |
| G06T 15/06 | (2011.01) |
| G06T 15/08 | (2011.01) |
| H04N 13/00 | (2006.01) |

(52) U.S. Cl.
CPC ......... *H04N 13/0239* (2013.01); *G06T 15/06* (2013.01); *G06T 15/08* (2013.01); *G06T 15/205* (2013.01); *H04N 13/0018* (2013.01)

(58) Field of Classification Search
USPC ....................................................... 345/426
See application file for complete search history.

(56) References Cited

U.S. PATENT DOCUMENTS

| | | | |
|---|---|---|---|
| 6,396,946 B1* | 5/2002 | Sogawa ........... | G01S 11/12 348/E13.014 |
| 2009/0102834 A1* | 4/2009 | Tomite ............ | G06T 19/00 345/419 |
| 2012/0075300 A1* | 3/2012 | Hur ................ | H04M 1/6058 345/419 |
| 2012/0099804 A1 | 4/2012 | Aguilera et al. | |
| 2013/0141435 A1* | 6/2013 | Cho ................ | G06T 15/50 345/426 |

FOREIGN PATENT DOCUMENTS

EP   2199737 A1   6/2010

OTHER PUBLICATIONS

Larry F. Hodges "Tutorial: Time-Multiplexed Stereoscopic Computer Graphics" IEEE Computer Graphics and Applications, Issue No. 02—Mar./Apr. 1992 vol. 12, pp. 20-30.*
Hodges, Larry F. "Tutorial: Time-multiplexed stereoscopic computer graphics." IEEE computer graphics and applications 12.2 (1992): 20-30.*
Hodges (IEEE Computer Graphics and Applications, Issue No. 02—Mar./Apr. 1992 vol. 12, pp. 20-30).*

* cited by examiner

*Primary Examiner* — Yuwen Pan
*Assistant Examiner* — Zhitong Chen
(74) *Attorney, Agent, or Firm* — Procopio, Cory, Hargreaves & Savitch LLP

(57) ABSTRACT

Rendering a stereoscopic image of a 3-D environment, including: tracing a path of ray from a camera to a light source for every pixel in a view window; determining shading of all pixels in the view window; and adjusting the shading for all pixels to show horizontal displacement but substantially reduce vertical displacement in the stereoscopic image. Keywords include shading and horizontal displacement.

4 Claims, 4 Drawing Sheets

ADJUSTING HORIZONTAL AND VERTICAL SHADING IN 3-D RENDERING

BACKGROUND

Field of the Invention

The present invention relates to a technique for stereo rendering of objects, and more specifically, to using substantially horizontal offsets in stereo rendering.

Background

A 3-D graphics method such as ray tracing is a technique for rendering a 3-D scene with complex light interactions. It is based on modeling reflection and refraction by recursively following the path that light takes as it travels through the scene. To make the processing manageable, the light is traced backwards from the camera to the light source. However, ray tracing over curved surfaces may cause undesirable problems for viewers of the 3-D images.

SUMMARY

The present invention provides for adjusting horizontal and vertical shading in 3-D rendering to make the stereoscopic effect easier on the viewer's eyes without negating the refractive and/or reflective effects.

In one implementation, a method of rendering a stereoscopic image of a 3-D environment is disclosed. The method includes: tracing a path of ray from a camera to a light source for every pixel in a view window; determining shading of all pixels in the view window; and adjusting the shading for all pixels to show horizontal displacement but substantially reduce vertical displacement in the stereoscopic image.

In another implementation, a method of rendering images is disclosed. The method includes: rendering a pair of left and right images of a 3-D environment for viewing by a viewer, comprising: tracing a path of ray from a camera to a light source for every pixel in a view window; determining shading of all pixels of the pair of left and right images, wherein the shading is adjusted to be biased in a horizontal direction such that vertical displacement of objects within the pair of left and right images is substantially reduced.

In yet another implementation, a stereoscopic rendering system is disclosed. The system includes: a stereoscopic renderer configured to render a 3-D image by tracing a path of ray from a camera to a light source for every pixel in a view window of the camera, and determining shading of all pixels in the view window; a shading adjuster configured to adjust the shading for all pixels to show horizontal displacement but substantially reduce vertical displacement in the 3-D image.

In yet another implementation, a non-transitory storage medium storing a computer program to render a stereoscopic image of a 3-D environment is disclosed. The computer program includes executable instructions that cause a computer to: trace a path of ray from a camera to a light source for every pixel in a view window; determine shading of all pixels in the view window; and adjust the shading for all pixels to show horizontal displacement but substantially reduce vertical displacement in the stereoscopic image.

Other features and advantages of the present invention will become more readily apparent to those of ordinary skill in the art after reviewing the following detailed description and accompanying drawings.

DETAILED DESCRIPTION

Certain implementations as disclosed herein provide for adjusting horizontal and vertical displacements or parallax in 3-D rendering to make the stereoscopic effect easier on the viewer's eyes without negating the refractive and/or reflective effects. After reading this description it will become apparent how to implement the invention in various implementations and applications. Although various implementations of the present invention will be described herein, it is understood that these implementations are presented by way of example only, and not limitation. As such, this detailed description of various implementations should not be construed to limit the scope or breadth of the present invention.

Human eyes are generally about 6 to 7 cm apart, and therefore each eye has a slightly different view of an object. Since the distance between left and right eyes causes a disparity of an image, an image having a stereoscopic effect can be perceived by assembling the disparity in the brain. This principle is basically applied to produce a 3-D image. For example, when the eyes observe a curved object such as a soda can, the brain perceives a similar object from images of the curved object that are respectively observed by the left and right eyes. Further, a depth of the object can be felt by perceiving a parallax difference caused by the differently observed images of the left and right eyes. Thus, a 3-D picture that is comfortable to watch comprises left and right images that make left-right movements with respect to the eye level when switching between the left and right images. However, as described above, a 3-D rendering over curved surface using techniques such as ray tracing may cause undesirable problems for viewers including excessive vertical displacement in the reflected and refracted rays bouncing back to the viewers.

Figure 1:
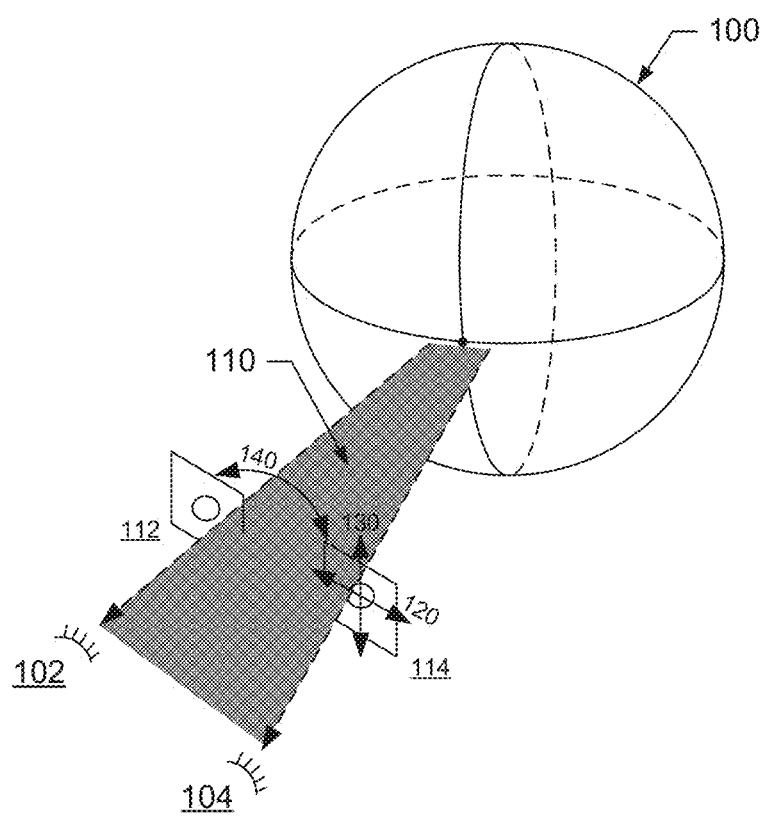
FIG. 1 shows a functional diagram of a pair of cameras viewing an object in a 3-D environment.

Referring to FIG. 1, for example, when the eyes 102, 104 observe a spherical object 100, the brain perceives a similar object from images of the spherical object 100 that are respectively observed by the left 102 and right 104 eyes. In actual implementations, the left 102 and right eyes 104 represent two cameras separated by an appropriate distance to provide depth to the objects. Accurate 3-D rendering (using, for example, ray tracing) of a spherical object 100 produces vertical displacement 130 as well as horizontal displacement 120 with respect to the eye level plane 110 of the viewer (or camera axis horizontal plane) when switching 140 between left 112 and right images 114. However, long term exposure to the vertical displacements 130 may cause dizziness, headache, or other uncomfortable feelings for the viewer.

Figure 2:
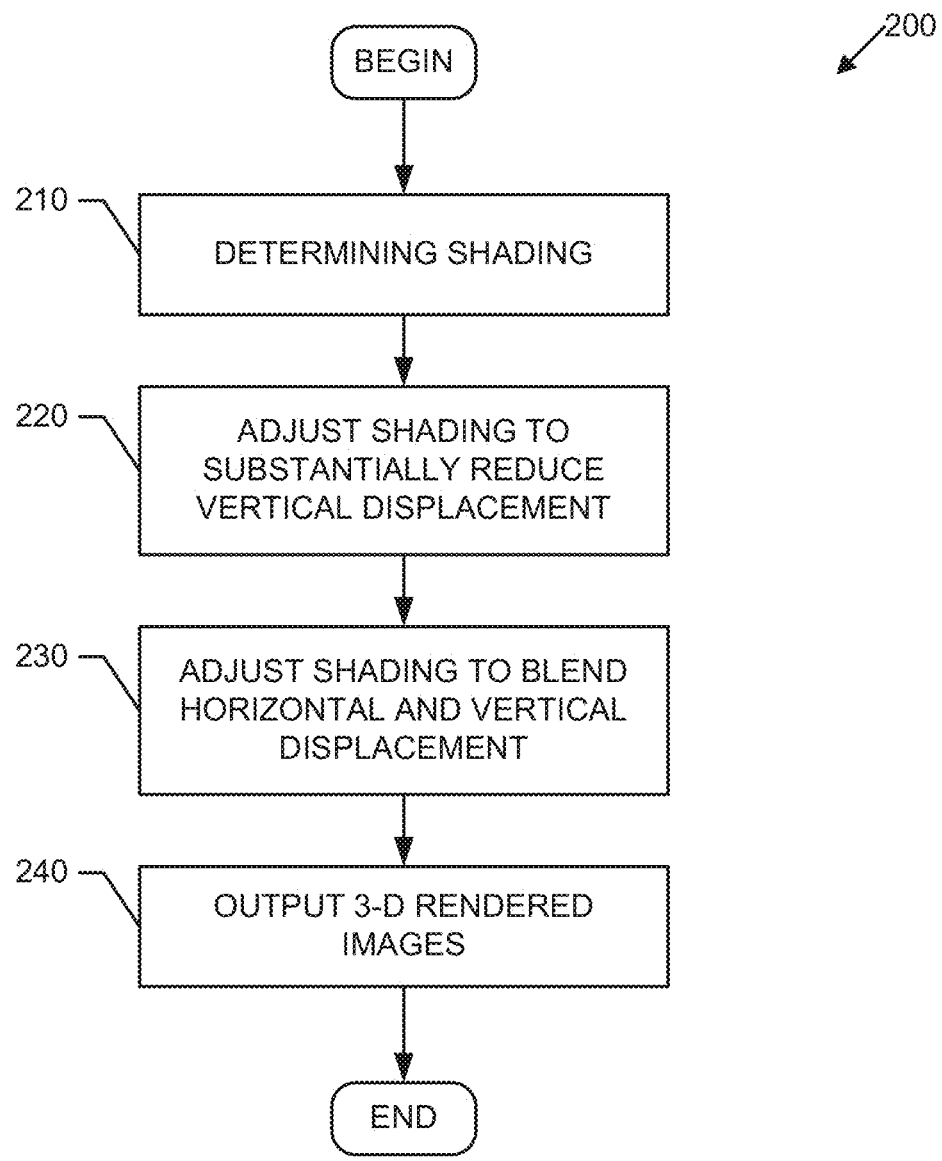
FIG. 2 is a flowchart illustrating a stereoscopic rendering technique in accordance with one implementation of the present invention.

FIG. 2 is a flowchart illustrating a stereoscopic rendering technique 200 in accordance with one implementation of the present invention. In the illustrated implementation of FIG. 2, the stereoscopic rendering is performed using a tracing method such as a ray tracing in which 3-D image is rendered by tracing a path of ray from a camera to the light source for every pixel in a view window 112, 114 and determining the color or shading of all pixels in the view window, at box 210. To render the 3-D image, the tracing of the ray through the view window 112, 114 should be done for both left 102 and right 104 cameras. However, as described above, the displacement between the left and right cameras may include excessive vertical displacement 130 to cause uncomfortable feelings for the viewer. Accordingly, a shader, which renders the 3-D image (e.g., 114 in FIG. 1) by coloring each pixel in the view window 112, 114, adjusts the color of the pixels to show the horizontal displacement 120 but substantially reduce or hide the vertical displacement 130 in the rendered images, at box 220. As described above, the shader adjusts the displacements to substantially reduce the vertical displacement 130 which is defined as vertical movement with respect to the horizontal plane of the camera axis (equivalent to the eye level plane 110 in FIG. 1). Rendering the stereoscopic images in this manner provides more comfortable experience for the viewer. However, ignoring shading for the vertical displacement completely may cause negation of refractive and/or reflective effects present in the 3-D environment, especially in rendering curved surfaces. Accordingly, when further adjustment is desired to smooth the rendered image and preserve the refractive and/or reflective effects, the shading is adjusted, at box 230, to appropriately blend the shading to account for both horizontal and vertical displacements while providing comfortable viewing experience for the viewer, without negating the refractive and/or reflective effects of the 3-D environment. The stereoscopic rendering of the 3-D images is then output, at box 240.

In an alternative implementation to the stereoscopic rendering technique 200, a pair of left and right images of a 3-D environment is rendered for viewing by a viewer. The alternative technique includes: tracing a path of ray from a camera to a light source for every pixel in a view window; determining shading for all pixels of the pair of left and right images, wherein the shading is adjusted to be biased in a horizontal direction such that vertical displacement of objects within the pair of left and right images is substantially reduced. The alternative technique further includes adjusting the shading in the left and right images to blend the horizontal and vertical displacements to provide a comfortable viewing experience for the viewer without negating refractive and reflective effects of the 3-D environment.

Figure 3:
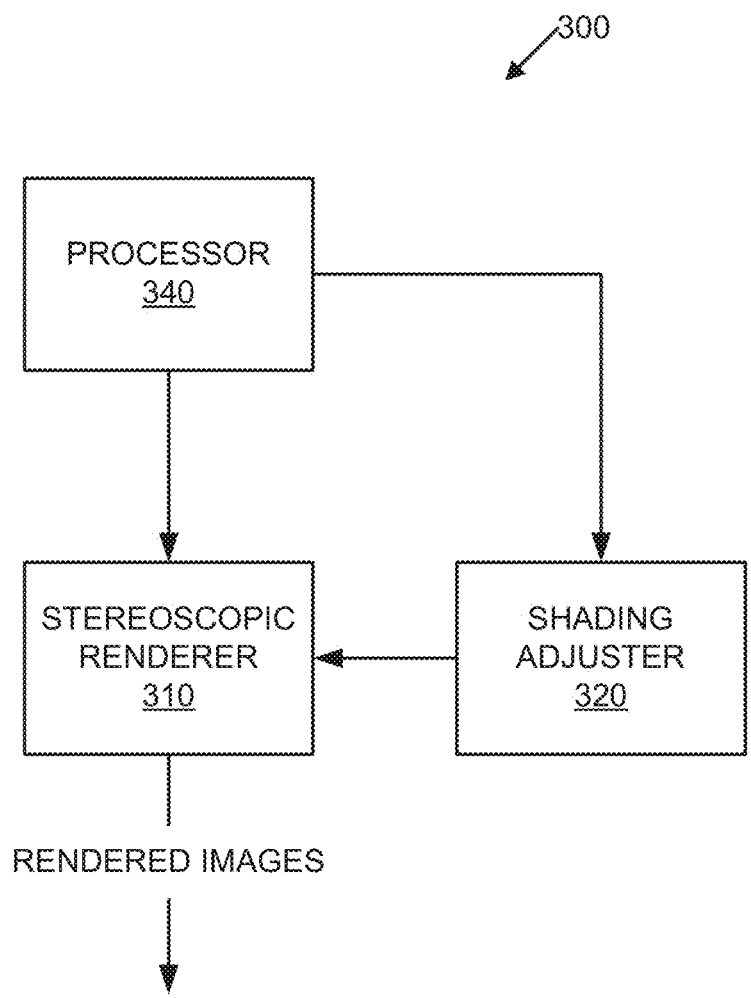
FIG. 3 is a functional block diagram of one implementation of a stereoscopic rendering system.

FIG. 3 is a functional block diagram of one implementation of a stereoscopic rendering system 300. The rendering system 300 includes a processor 340, a stereoscopic renderer 310, and a shading adjuster 320. A pair of cameras captures a pair of images as a ray of light reflecting from objects within a 3-D environment.

Figure 4A:
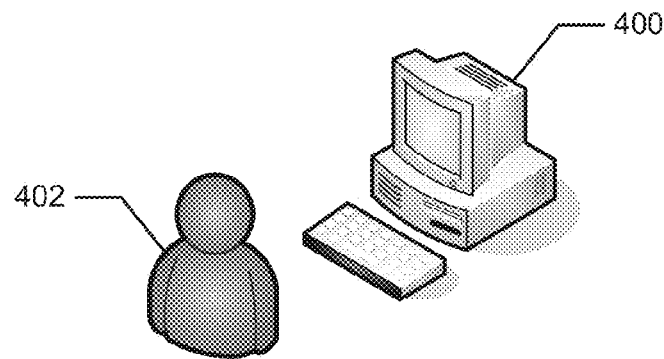
FIG. 4A illustrates a representation of a computer system and a user.

In the illustrated implementation of FIG. 3, the stereoscopic rendering is performed by the renderer 310 using, for example, ray tracing in which the image is rendered by tracing a path of ray from the camera to the light source for every pixel in the view window (e.g., 112, 114 in FIG. 1). The renderer 310 determines the color or shading of all pixels in the view window. To render the 3-D image, the tracing of the ray through the view window should be done for both left and right cameras. However, as described above, the displacement between the left and right cameras may include excessive vertical displacement to cause uncomfortable feelings for the viewer. In one implementation, the shading adjuster 320 adjusts the colors of the pixels in the view window to show the horizontal displacement but substantially reduce or hide the vertical displacement in the rendered image. As described above, the shading adjuster 320 adjusts the displacements to substantially reduce the vertical displacement which defined as vertical movement with respect to the horizontal plane of the camera axis. Adjustments made by the shading adjuster 320 may include appropriately blending horizontal and vertical shadings to provide comfortable viewing experience for the viewer, without negating the refractive and/or reflective effects of the 3-D environment. FIG. 4A illustrates a representation of a computer system 400 and a user 402. The user 402 uses the computer system 400 to perform various operations described with respect to FIGS. 2 and 3. Thus, the computer system 400 includes a stereoscopic rendering system 490 including a shading adjuster.

Figure 4B:
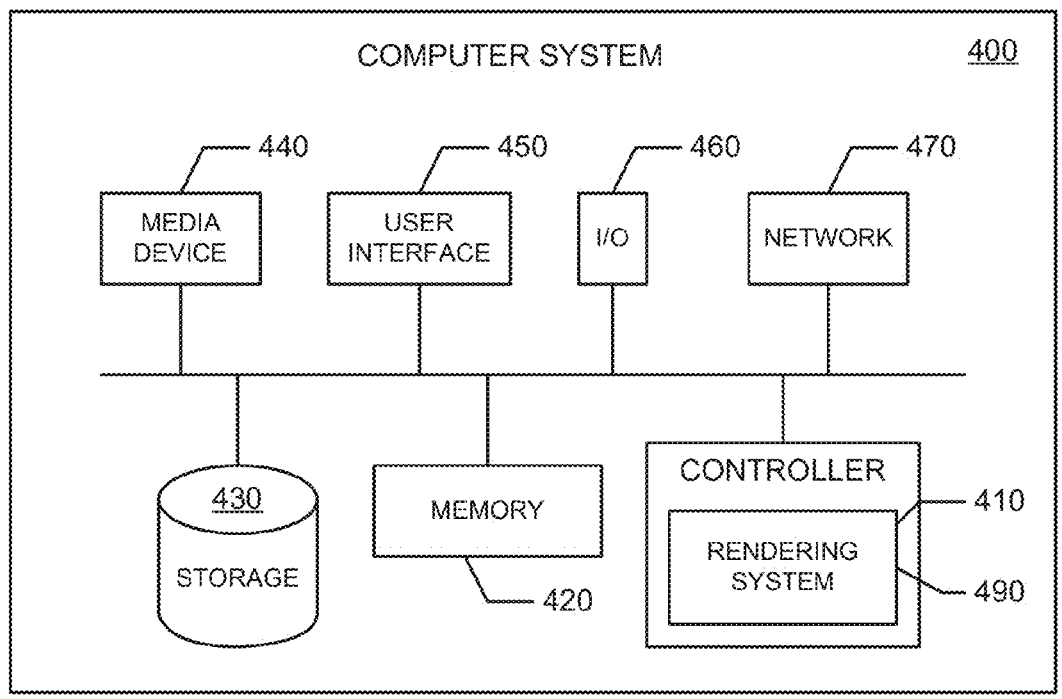
FIG. 4B is a functional block diagram illustrating the computer system hosting a stereoscopic rendering system.

FIG. 4B is a functional block diagram illustrating the computer system 400 hosting the stereoscopic rendering system 490. The controller 410 is a programmable processor and controls the operation of the computer system 400 and its components. The controller 410 loads instructions (e.g., in the form of a computer program) from the memory 420 or an embedded controller memory (not shown) and executes these instructions to control the system. In its execution, the controller 410 provides the stereoscopic rendering system 490 as a software system. Alternatively, this system can be implemented as separate hardware components in the controller 410 or the computer system 400.

Memory 420 stores data temporarily for use by the other components of the computer system 400. In one implementation, memory 420 is implemented as RAM. In one implementation, memory 420 also includes long-term or permanent memory, such as flash memory and/or ROM.

Non-transitory storage 430 stores data for use by other components of the computer system 400, such as for storing data used by the on set metadata acquisition unit 490. In one implementation, storage 430 is a hard disk drive.

The media device 440 receives removable media and reads and/or writes data to the inserted media. In one implementation, for example, the media device 440 is an optical disc drive.

The user interface 450 includes components for accepting user input from the user 402 and presenting information to the user 402. In one implementation, the user interface 450 includes a keyboard, a mouse, audio speakers, and a display. The controller 410 uses input from the user 402 to adjust the operation of the computer system 400.

The I/O interface 460 includes one or more I/O ports to connect to corresponding I/O devices, such as external storage or supplemental devices (e.g., a printer or a PDA). In one implementation, the ports of the I/O interface 460 include ports such as: USB ports, PCMCIA ports, serial ports, and/or parallel ports. In another implementation, the I/O interface 460 includes a wireless interface for communication with external devices wirelessly.

The network interface 470 includes a wired and/or wireless network connection, such as an RJ-45 or "Wi-Fi" interface (including, but not limited to 802.11) supporting an Ethernet connection.

The computer system 400 includes additional hardware and software typical of computer systems (e.g., power, cooling, operating system), though these components are not specifically shown in FIG. 4B for simplicity. In other implementations, different configurations of the computer system can be used (e.g., different bus or storage configurations or a multi-processor configuration).

The above description of the disclosed implementations is provided to enable any person skilled in the art to make or use the invention. Various modifications to these implementations will be readily apparent to those skilled in the art, and the generic principles described herein can be applied to other implementations without departing from the spirit or scope of the invention. Accordingly, additional implementations and variations are also within the scope of the invention. For example, although the description is directed to adjusting shading in stereoscopic rendering, other parameter(s) in lieu of or in addition to shading, such as hue, can be adjusted to provide the illusion of depth. Further, it is to be understood that the description and drawings presented herein are representative of the subject matter which is broadly contemplated by the present invention. It is further understood that the scope of the present invention fully encompasses other implementations that may become obvious to those skilled in the art and that the scope of the present invention is accordingly limited by nothing other than the appended claims.

The invention claimed is:

1. A method of rendering a stereoscopic image of a 3-D environment having left and right images, comprising:
    tracing a path of ray from a camera to a light source for every pixel in a view window of the camera corresponding to each image of the left and right images;
    determining shading of all pixels in the view window of each image,
    wherein the shading considers a difference in displacements in a horizontal direction between the left and right images;
    adjusting the shading for all pixels to show substantially more horizontal displacement with respect to a horizontal plane of the path of ray than vertical displacement with respect to the horizontal plane in each image which substantially reduce the vertical displacement without negating refractive and reflective effects provided by the vertical displacement,
    wherein the horizontal displacement with respect to the horizontal plane of the path of ray corresponds to left-right movements on the horizontal plane in the stereoscopic image; and
    blending the shading to account for both the horizontal displacement and the vertical displacement.

2. A method comprising:
    rendering left and right images of a 3-D environment for viewing by a viewer, wherein rendering each image of the left and right images comprises:
    tracing a path of ray from a camera to a light source for every pixel in a view window corresponding to each image;
    determining shading of all pixels of each image,
    wherein the shading considers a difference in displacements in a horizontal direction between the left and right images;
    first adjusting the shading of all pixels in each image to be biased more in the horizontal direction with respect to a horizontal plane of the path of ray than a vertical direction with respect to the horizontal plane such that displacements in the vertical direction of objects within each image are substantially reduced without negating refractive and reflective effects provided by displacements in the vertical direction,
    wherein displacements in the horizontal direction with respect to the horizontal plane of the path of ray corresponds to left-right movements within each image; and
    second adjusting the shading to blend the displacements in the horizontal direction with the displacements in the vertical direction.

3. An apparatus for rendering a stereoscopic image of a 3-D environment, comprising:
    means for tracing a path of ray from a camera to a light source for every pixel in a view window of the camera corresponding to each image of the left and right images;
    means for determining shading of all pixels in the view window of each image,
    wherein the shading considers a difference in displacements in a horizontal direction between the left and right images;
    means for adjusting the shading for all pixels to show more horizontal displacement with respect to a horizontal plane of the path of ray than vertical displacement with respect to the horizontal plane in each image which substantially reduce the vertical displacement in the stereoscopic image without negating refractive and reflective effects provided by the vertical displacement,
    the means for adjusting the shading blending the shading to account for both the horizontal displacement and the vertical displacement; and
    means for controlling including a controller, the controller configured to control the means for rendering and the means for adjusting to generate the 3-D image.

4. A non-transitory storage medium storing a computer program to render a stereoscopic image of a 3-D environment, the computer program comprising executable instructions that cause a computer to:
    trace a path of ray from a camera to a light source for every pixel in a view window of the camera corresponding to each image of the left and right images;
    determine shading of all pixels in the view window of each image,
    wherein the shading considers a difference in displacements in a horizontal direction between the left and right images;
    adjust the shading for all pixels to show substantially more horizontal displacement with respect to a horizontal plane of the path of ray than vertical displacement with respect to the horizontal plane in each image without negating refractive and reflective effects provided by the vertical displacement,
    wherein the horizontal displacement with respect to the horizontal plane of the path of ray corresponds to left-right movements on the horizontal plane in the stereoscopic image; and
    blend the shading to account for both the horizontal displacement and the vertical displacement.

* * * * *